US010023746B2

(12) United States Patent
Henglein et al.

(10) Patent No.: US 10,023,746 B2
(45) Date of Patent: Jul. 17, 2018

(54) WHITE PIGMENT REFLECTING IR RADIATION, PRODUCTION AND USE THEREOF

(71) Applicant: Eckart GmbH, Hartenstein (DE)

(72) Inventors: Frank Henglein, Nürrnberg (DE); Christian Schramm, Hersbruck (DE); Ulrich Schmidt, Hersbruck (DE); Harald Weiss, Fürth (DE); Jasmin Bleisteiner, Kirchensittenbach (DE); Michael Grüner, Auerbach (DE)

(73) Assignee: ECKART GMBH (DE)

( * ) Notice: Subject to any disclaimer, the term of this patent is extended or adjusted under 35 U.S.C. 154(b) by 0 days.

(21) Appl. No.: 14/641,976

(22) Filed: Mar. 9, 2015

(65) Prior Publication Data
US 2015/0247040 A1    Sep. 3, 2015

Related U.S. Application Data

(62) Division of application No. 12/158,133, filed as application No. PCT/EP2006/012416 on Dec. 21, 2006, now abandoned.

(30) Foreign Application Priority Data

Dec. 21, 2005    (DE) .................. 10 2005 061 684

(51) Int. Cl.
C09C 3/10    (2006.01)
C09C 3/06    (2006.01)
(Continued)

(52) U.S. Cl.
CPC .............. *C09C 3/10* (2013.01); *C09C 1/0015* (2013.01); *C09C 1/0021* (2013.01); *C09C 1/642* (2013.01);
(Continued)

(58) Field of Classification Search
CPC .............. C01P 2002/82; C01P 2004/20; C01P 2004/62; C01P 2006/62; C08K 3/08;
(Continued)

(56) References Cited

U.S. PATENT DOCUMENTS 3,087,828 A    4/1963    Linton
5,037,475 A    8/1991    Chida et al.
(Continued)

FOREIGN PATENT DOCUMENTS

CN    1233635 A    11/1999
CN    1071673 C    9/2001
(Continued)

OTHER PUBLICATIONS

Third Office Action dated Dec. 22, 2014 in corresponding Chinese Patent Application No. 2012101018056 (with English language translation)(20 total pages).
(Continued)

*Primary Examiner* — Shuangyi Abu Ali
(74) *Attorney, Agent, or Firm* — Ostrolenk Faber LLP

(57) ABSTRACT

The invention relates to a pigment which reflects IR radiation, comprising an IR-reflecting core, the IR-reflecting core being provided with a substantially enveloping coating which is transparent to IR radiation, and in that the IR-reflecting pigment is substantially white. The invention further relates to a process for producing these pigments and also to their use.

25 Claims, 3 Drawing Sheets

(51) Int. Cl.
*C09C 1/00* (2006.01)
*C09C 1/64* (2006.01)
*C09D 5/33* (2006.01)
*C09D 11/037* (2014.01)
*C09D 7/40* (2018.01)
*C08K 3/08* (2006.01)
*C08K 9/02* (2006.01)

(52) U.S. Cl.
CPC .............. *C09C 1/648* (2013.01); *C09C 3/063* (2013.01); *C09D 5/004* (2013.01); *C09D 7/69* (2018.01); *C09D 7/70* (2018.01); *C09D 11/037* (2013.01); *C01P 2002/82* (2013.01); *C01P 2004/20* (2013.01); *C01P 2004/62* (2013.01); *C01P 2006/62* (2013.01); *C08K 3/08* (2013.01); *C08K 9/02* (2013.01); *C09C 2200/1058* (2013.01); *C09C 2200/505* (2013.01); *C09C 2210/10* (2013.01); *C09C 2220/10* (2013.01)

(58) Field of Classification Search
CPC ....... C08K 9/02; C09C 1/0015; C09C 1/0021; C09C 1/642; C09C 1/648; C09C 2200/1058; C09C 2200/505; C09C 2210/10; C09C 2220/10
See application file for complete search history.

(56) References Cited

U.S. PATENT DOCUMENTS

| | | | |
|---|---|---|---|
| 5,271,770 | A | 12/1993 | Noguchi et al. |
| 5,350,448 | A | 9/1994 | Dietz et al. |
| 5,562,763 | A | 10/1996 | Bruckner et al. |
| 5,607,504 | A | 3/1997 | Schmid et al. |
| 5,614,219 | A | 3/1997 | Wunderlich et al. |
| 5,863,321 | A | 1/1999 | Crumley et al. |
| 5,931,996 | A | 8/1999 | Reisser et al. |
| 6,433,271 | B1 | 8/2002 | Arnborg |
| 6,508,876 | B1 | 1/2003 | Bernhardt et al. |
| 6,565,973 | B2 | 5/2003 | Duff et al. |
| 6,800,684 | B2 | 10/2004 | Hayashi et al. |
| 6,818,297 | B1 * | 11/2004 | Atarashi ............... B82Y 30/00 427/407.1 |
| 7,169,222 | B2 | 1/2007 | Brückner et al. |
| 7,960,026 | B2 | 6/2011 | Koller et al. |
| 2001/0044489 | A1 | 11/2001 | Hugo |
| 2006/0032403 | A1 | 2/2006 | Kaupp et al. |
| 2007/0172438 | A1 | 7/2007 | Kruger et al. |
| 2009/0264575 | A1 | 10/2009 | Henglein et al. |

FOREIGN PATENT DOCUMENTS

| | | |
|---|---|---|
| CN | 1468289 A | 1/2004 |
| CN | 1511889 A | 7/2004 |
| CN | 1517412 A | 8/2004 |
| DE | 34 32 998 | 5/1986 |
| DE | 40 35 062 | 5/1992 |
| DE | 41 40 195 | 6/1993 |
| DE | 42 11 560 | 10/1993 |
| DE | 44 18 214 | 11/1995 |
| DE | 19 501 307 | 7/1996 |
| DE | 197 18459 | 11/1998 |
| DE | 100 10538 | 9/2001 |
| EP | 0 065 207 | 11/1982 |
| EP | 0 246 342 | 11/1987 |
| EP | 0 361 327 | 4/1990 |
| EP | 0 567 868 A1 | 11/1993 |
| EP | 0 765 274 B1 | 3/2000 |
| EP | 1 179 507 A1 | 2/2002 |
| FR | 2 664 160 | 1/1992 |
| FR | 2664160 | 1/1992 |
| JP | H-01313575 A | 12/1989 |
| JP | 04-069317 | 3/1992 |
| JP | A-H04-69317 | 3/1992 |
| JP | H-06299100 A | 10/1994 |
| JP | 2000-355663 | 12/2000 |
| JP | A-2000-355663 | 12/2000 |
| JP | 2002-179947 | 6/2002 |
| JP | 2003-147228 A | 5/2003 |
| JP | 2005002238 A | 1/2005 |
| JP | 2005-330466 | 12/2005 |
| JP | A-2005-330466 | 12/2005 |
| WO | WO 91/04293 | 4/1991 |
| WO | WO 92/08152 | 5/1992 |
| WO | WO 96/23337 | 7/1996 |
| WO | WO 2005/007754 | 1/2005 |
| WO | WO 2005/063897 A2 | 7/2005 |
| WO | WO 2005/074865 | 8/2005 |
| WO | WO 2013/175339 A1 | 11/2013 |

OTHER PUBLICATIONS

Xiaoliang Zhu, et al., "Thermotechnical Measurement and Instrument Therefor ($3^{rd}$ Edition)," ed., $3^{rd}$ edition, Beijing; China Electric Power Press, Apr. 2011 (4 total pages).
Renhua Zhong, et al., "Infrared Seeker for Cruise Missile," Beijing, China Aerospace Press, Sep. 1995 (Aug. 2009 reprint), Collections of Missile and Spaceflight, vol. 4, Cruise Missile Series (5 total pages).
Prof. Dr. Andreas Beck, et al., University of Applied Science, Stuttgart u.a., "Energy Efficiency and Comfort by Means of Insulation," Otti-Profiforum "Wärmedämmung im Bauwesen" 09. + Oct. 3, 2005, pp. 167-183.
Chinese Office Action dated Nov. 18, 2013 issued in corresponding Chinese Patent Application No. 201210101811.1 (with English language translation).
Chinese Office Action dated Dec. 20, 2013 issued in corresponding Chinese Patent Application No. 201210101805.6 (with English language translation).
Japanese Office Action dated Jul. 2, 2013 in corresponding Japanese Patent Application No. 2008-546270 (with English language translation).
Notice of Reasons for Rejection dated Mar. 27, 2012 in corresponding Japanese Patent Application No. 2008-546270 (with English translation).
European Office Action dated Jul. 28, 2011 in corresponding European Patent Application No. EP 06 841 105.7.
International Search Report dated Aug. 28, 2008 issued in corresponding PCT Application No. PCT/EP2006/012416.
Office Action issued by the German Patent Office dated Aug. 7, 2006 in connection with corresponding German Patent Application No. 10 2005 061 684.4.
A.B. J. Rodriguez, "MetallicFlop and Its Measurement" JOCCA, (1992(4)) p. 150-153.
K. Rose et al., "A Pot-pourri of Properties—Inorganic-organic Hybrid Polymers for Masonry Paints with Reduced Heat Radiation and Dirt Pick-up Tendency", Farbe & Lack 108 (2002), No. 8, p. 29 (3 pages).

* cited by examiner

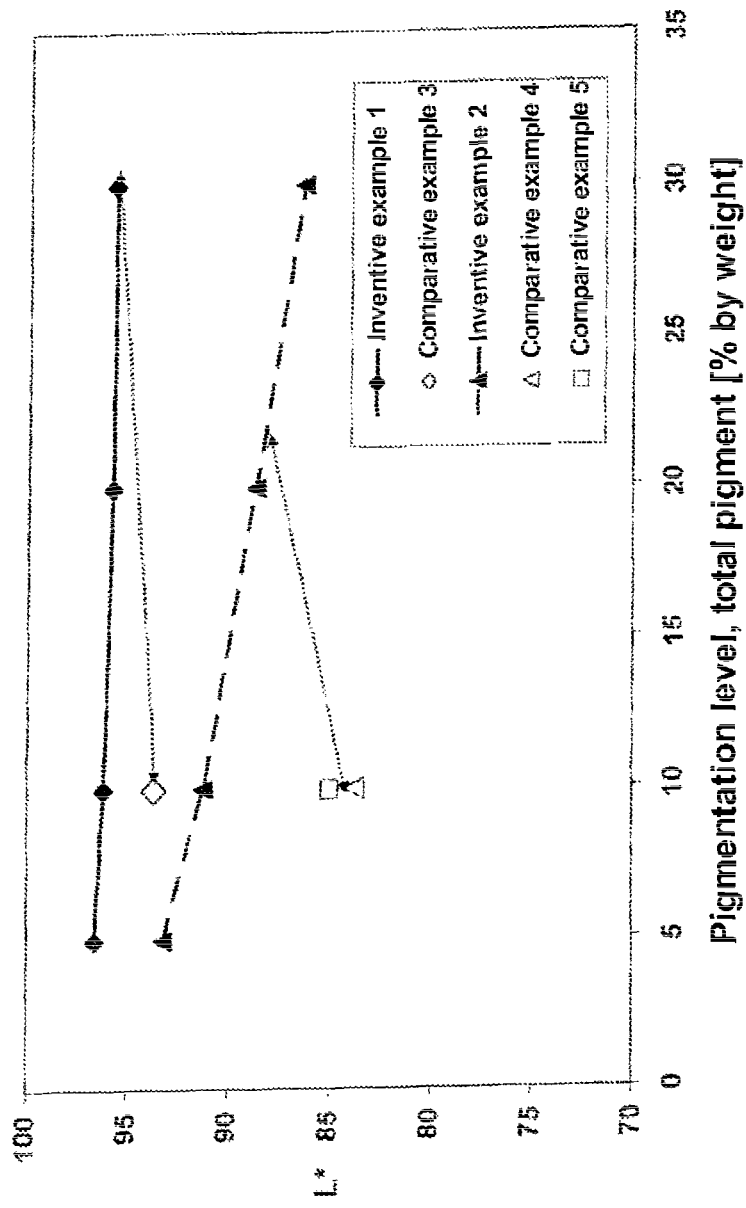

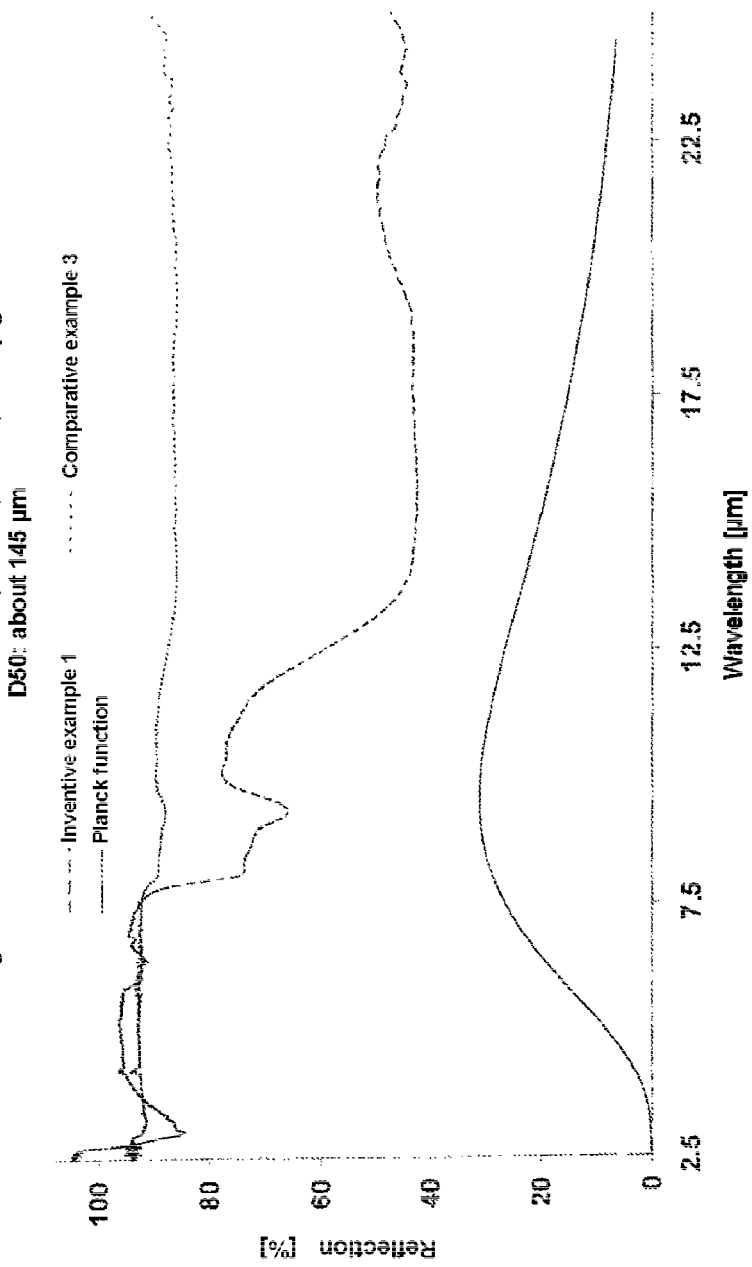

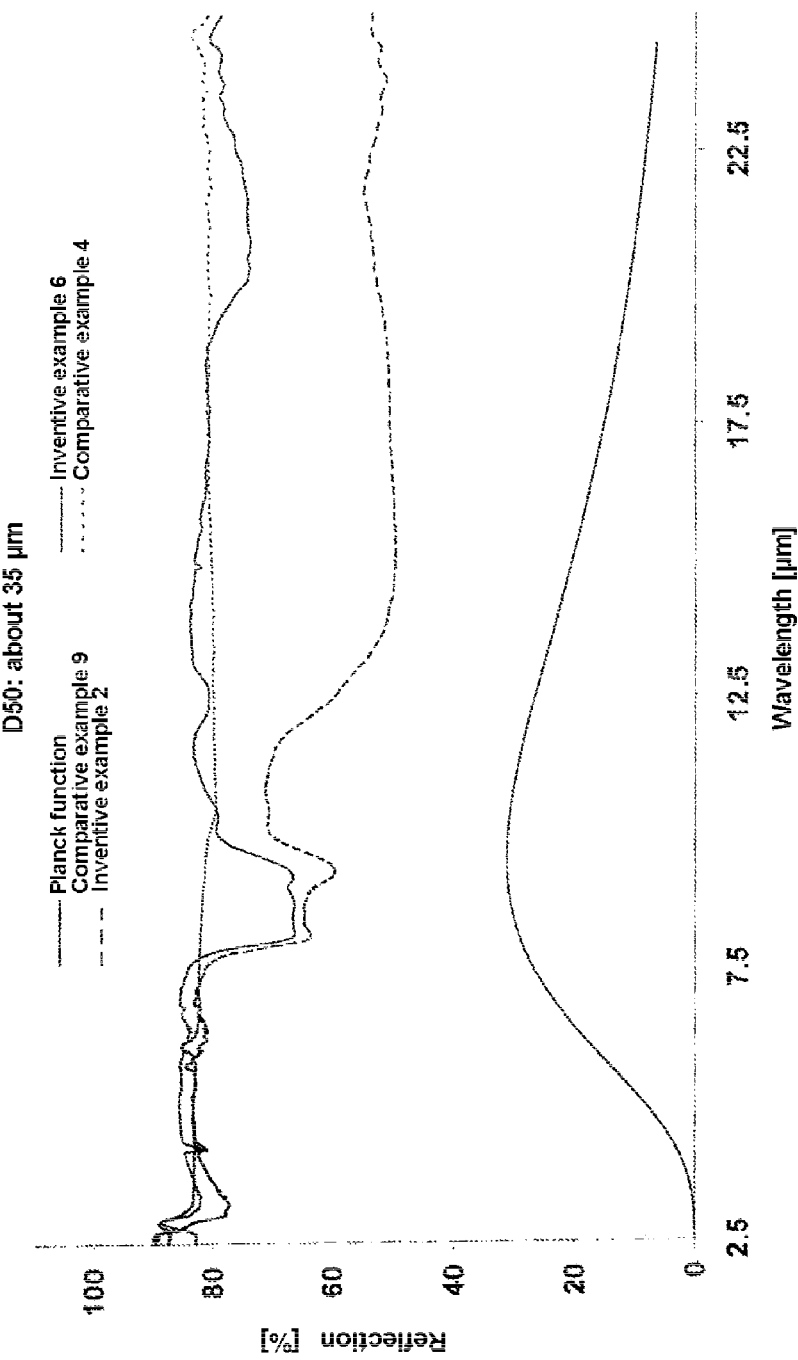

WHITE PIGMENT REFLECTING IR RADIATION, PRODUCTION AND USE THEREOF

CROSS-REFERENCE TO RELATED APPLICATIONS

The present application is a continuation of prior U.S. patent application Ser. No. 12/158,133, filed Jun. 19, 2008, by Frank Henglein, Christian Schramm, Ulrich Schmidt, Harald Weiss, Jasmin Bleisteiner and Michael Grüner, entitled "WHITE PIGMENT REFLECTING IR RADIATION, PRODUCTION AND USE THEREOF," which is a 35 U.S.C. § 371 National Phase conversion of International Application No. PCT/EP2006/012416, filed Dec. 21, 2006, which claims priority of German Patent Application No. 10 2005 061 684.4, filed Dec. 21, 2005. The PCT International Application was published in the German language. The contents of each of the patent applications above-listed are incorporated in full herein by reference.

The invention relates to largely white pigments which reflect IR radiation and also to their production and also to their use.

Wall paints are typically pigmented with white pigments such as titanium dioxide or barium sulfate. On the basis of this white base paint, colored emulsion paints are obtained by tinting with corresponding color pigments. The constituents of the emulsion paints, such as binders, pigments and/or fillers, for example, exhibit at least partial absorption of IR radiation, however. Consequently the thermal radiation is not reflected and is ultimately emitted to the outside.

From K. Rose, U. Posset, K.-H. Haas and M. Köhl, *Farbe & Lack* 108 (2002) p. 29 it is known that aluminum pigments coated with $SiO_2$ allow improved reflection of IR radiation in an emulsion paint.

In "Komfort and Energieeffizienz durch Wärmedämmung" [Comfort and energy efficiency through heat insulation], Prof. Dr. Beck, *Otti-Profiforum "Wärmedämmung im Bauwesen"* 9+10 Mar. 2005, Regensburg, it is expounded that interior room walls painted with wall paints comprising IR-reflecting pigments generate a pleasant feel-good ambience. The person in a room acts as a blackbody radiator with a maximum of the irradiated IR radiation of about 10 μm. Although the IR radiation accounts only for a fraction of a few percent of the total thermal economy of an interior room, subjectively the person reacts very sensitively to radiation sinks within a room. Consequently a uniform reflection of the IR radiation by the walls generates an extremely pleasant, "feel-good ambience".

The use of, say, aluminum pigments as IR-reflecting pigments, however, has the disadvantage that the wall paint acquires a metallic appearance. In the majority of cases, however, this is unwanted. Metallic pigments in a wall paint, furthermore, significantly show up the unevennesses in the substrate. In addition, depending on concentration and particle size, the use of aluminum pigments has the disadvantageous effect of a graying of the emulsion paint. The majority of emulsion paints are white, and white emulsion paints are also used as a basis for tinting with color pigments in order to produce colored emulsion paints.

DE 42 11 560 A1 discloses a coating of substrates, which among others may be metal flakes or mica pigments, with white pigments having a particle size below 1 μm. The pigments are applied to the substrate merely by means of spray drying, without any further coating, and therefore possess deficient adhesion to said substrate.

DE 100 10 538 A1 discloses a dirt-repelling coating material which discloses a complex composition, which as well as a multiplicity of components and particles may also include platelet-shaped particles, such as aluminum pigments. One disadvantage of the coating material known from DE 100 10 538 A1 is that the metal pigments can corrode, and another is that the coating material has a metallic appearance or metallic effect.

DE 195 01 307 A1 discloses colored aluminum pigments wherein color pigments are incorporated in a metal oxide matrix which is produced by a sol-gel process. The resulting aluminum pigments are colored and metallically lustrous.

U.S. Pat. No. 5,037,475 likewise discloses colored aluminum pigments coated with color pigments. In this case the attachment of the color pigments is on the one hand via a thermally polymerized, unsaturated, polyfunctional carboxylic acid and on the other hand via a plastic coating. A disadvantage, again, is that the colored aluminum pigments thus produced have a distinctly metallic appearance.

In addition, WO 91/04293 discloses colored and metallically lustrous metal pigments.

In the case of the prior art identified above, the descriptions are always of effect pigments for the decorative sector. These pigments have not only a metallic effect but also a masstone, since the color pigments are fixed directly on the metallic surface.

WO 96/23337 discloses a coating material, featuring two particles—in one case platelet-shaped metal pigments and in the other case white pigments—which have a very high absorption in the near infrared range. The white pigments may also have been applied to the metal pigments. Not disclosed, however, is how the white pigments are fixed on the metal pigments.

WO 2005/007754 discloses colored pigments which have an infrared-reflecting core with a thickness below 0.2 μm. In this case no white pigments are disclosed, and nor is it disclosed how they are fixed on the metal pigments.

DE 40 35 062 A1 discloses an IR-reflecting substrate coated with a varnish layer which may comprise white, gray, black or chromatic pigments. Not disclosed herein are emulsion paints which can be applied to walls in the habitual way.

In accordance with the teaching of DE 197 18 459 A1 the intention is to use metal pigments having a whitish to grayish surface. This whitish to grayish surface is to be producible by means of various chemical reactions, although DE 197 18 459 A1 does not reveal which reactions must be carried out under which conditions in order to obtain the stated metal pigments.

There is therefore a need for IR-reflecting pigments, preferably metal pigments, which have a white appearance and in which any metallic effect is suppressed. A further object is to provide IR-reflecting pigments, preferably metal pigments, which, when used in an application medium, such as a paint or a varnish, for example, are not markedly visible to the human eye and do not lead to any substantial graying of the application medium.

It is a further object of the invention to provide an IR-reflecting pigment which is stable to corrosion in respect of the influence of water and alkalis. The pigment ought to be amenable to use in emulsion paints, not only in an interior wall paint but also in a masonry paint.

It is an object of the present invention, furthermore, to provide a cost-effective process for the production of such pigments.

The object on which the invention is based is achieved by means of a pigment which reflects IR radiation, comprising an IR-reflecting core, the IR-reflecting core being provided with a substantially enveloping coating which is substantially transparent to IR radiation, and the IR-reflecting pigment being substantially white.

The object is further achieved by means of a process for producing an IR-reflecting pigment, where a coating which is substantially transparent to IR radiation, together with white pigments and/or with particlelike coating outgrowths that scatter visible light, is applied to an IR-reflecting core.

The object on which the invention is based is further achieved through the use of the pigment of the invention in inks, paints, varnishes, printing inks, security-printing inks, and cosmetics.

The object is also achieved by means of a coating composition which comprises a pigment of the invention.

The article may be, for example, a coated wall material or ceiling material, a coated building material, such as façade material, for example, etc.

The inventors have surprisingly found that it is possible to provide a pigment which has an IR-reflecting core and at the same time appears substantially white to the human eye.

A particular surprise in this context was that an IR-reflecting core, such as a substrate having a metallic surface which reflects IR radiation extremely effectively, for example, can be coated in such a way that, on the one hand, the IR reflection capacity is not substantially impaired and, on the other hand, the pigment appears largely white and nonmetallic to the human eye.

The pigment of the invention can therefore be used in white application media, such as inks, paints, varnishes or cosmetics, for example, without there being any distinctly marked graying or any metallic luster or any strong sparkle effect on the part of the application medium.

Consequently the pigment of the invention is suitable more particularly for use in white emulsion paints which are typically used for painting interior room walls. It will be appreciated that emulsion paints of this kind comprising the pigments of the invention can also be tinted in a typical way through addition of further colorants.

For the production of the pigment of the invention, an IR-reflecting core is given a substantially uniform coating of pigmentlike particles which are opaque in the optical wavelength range and at the same time are largely IR-transparent. A core for the purposes of the invention is a particulate, preferably spherical or platelet-shaped, substrate. With very particular preference the substrate possesses a platelet-shaped form, since this geometric morphological form combines the greatest IR reflection with the least amount of material, i.e., a relatively low level of pigmentation.

FIG. 1 depicts the diffuse lightness L* of the drawdowns of pigments in wall paint and the pigmentation level of the pigment in % by weight.

FIG. 2 depicts the IR reflection measurement, diffuse, in KBr, 1.5% pigmentation with a D50 of about 145 µm.

FIG. 3 depicts the IR reflection measurement, diffuse, in KBr, 1.5% pigmentation with a D50 of about 35 µum.

The coating is preferably composed of the substantially IR-transparent pigment particles (white pigments) on the one hand and of a matrix material on the other hand. The substantially IR-transparent pigment particles may be fixed on the surface of the IR-reflecting core, by being incorporated in and/or on an optically transparent matrix, for example. This matrix provides preferably uniform envelopment of the core. This preferably enveloping matrix also protects the core against the corrosive effect of water or atmospheric gases.

A substantially enveloping coating for the purposes of the invention means that the IR-reflecting core is enveloped by the coating in such a way that, to a viewer, the core does not produce any perceptible lustrous impression. Furthermore, the degree of envelopment is so large that, in the case of a corrosion-susceptible metallic IR-reflecting core, the incidence of corrosion is suppressed or prevented.

As a result of the uniform coating of the IR-reflecting core with pigmentlike particles which are opaque in the optical wavelength range and at the same time are largely IR-transparent, the pigment of the invention overall acquires a largely white appearance. The optical effect originating from the IR-reflecting core is largely suppressed. Owing to the large IR transparency of the pigmentlike particles, surprisingly, the IR reflection capacity of the core is not—or not substantially—adversely affected.

In the context of this invention, "optical properties" or "optical effect" are always those properties of the IR-reflecting pigments that are visible to the human eye. Physically, these properties are determined substantially by the optical properties in the wavelength range from approximately 400 to approximately 800 nm.

In one preferred variant the white, optically opaque and IR-transparent pigmentlike particles are white pigments having an average primary particle size of preferably 180 to 400 nm, more preferably of 250 to 350 nm, and more preferably still of 270 to 330 nm. According to the Mie theory, pigments of this kind possess the greatest scattering cross section for electromagnetic wavelengths in the optical range from 400 to 800 nm. Both smaller and larger white pigments have far lower scattering properties. The lowest scattering is produced, for example, by nanoparticles having a primary particle size below from 30 to 40 nm, which are almost completely transparent. The fact that the particles preferably have a particle size with the greatest scattering cross section has the effect that they appear substantially white and the optical light almost do not reach the surface of the IR-reflecting core. Consequently the optical effect of the core, the metallic effect for example, is substantially suppressed and the overall pigment appears substantially white.

The white pigments may be selected, for example, from the group consisting of titanium dioxide, zinc oxide, magnesium oxide, zinc sulfide, calcium fluoride, lithium fluoride, sodium fluoride, potassium fluoride, calcium carbonate, lithopones, magnesium carbonate, barium sulfate, barium titanate, barium ferrite, and mixtures thereof. The white pigment is substantially transparent, preferably transparent, to IR radiation. The particle size, and also the amount of white pigment applied to the IR-reflecting core, are adjusted as a function of the white pigment used.

Preference is given to using $TiO_2$ in the rutile or anatase modification, barium sulfate, zinc oxide and/or zinc sulfide, with particular preference being given to $TiO_2$ and ZnO on account of their universal availability in all sizes. $TiO_2$ in the rutile form has proven very suitable.

By a coating which is substantially transparent to IR radiation is meant, for the purposes of the invention, that only a small fraction of IR radiation is absorbed by the coating and/or the white pigments. Together with the IR-reflecting properties of the core, this leads to a high IR reflectance. The IR reflectance $\rho_{IR}$ as a function of the temperature T can be calculated from the spectral reflectance $R(\lambda)$ by integration over all wavelengths, with the Planck function $i(T)$ as a weighting function:

$$\rho_{IR}(T) = \frac{\int_{1.4}^{35} R(\lambda) * i(T) d\lambda}{\int_{1.4}^{35} i(T) d\lambda} \quad (1)$$

The Planck function i(T) indicates how much a blackbody would emit at a given temperature T. The relevant spectral range for room temperature corresponds in good approximation to the wavelength range from 1.4 to 35 μm.

IR-reflecting pigments of the invention, in the wavelength range from 2.5 to 25 μm and at a calculated temperature of 300 K, have an IR reflectance of preferably more than 50%. With further preference the IR reflectance is at least 60% and with even further preference at least 70%. Very preferably the IR reflectance is at least 80%, and most preferably it is at least 85%.

The spectral IR reflectivity of the pigments of the invention can be determined by means of a diffuse reflection measurement in a KBr powder bed, as follows. First of all KBr powder is comminuted in a mortar. Then pigment is added to the KBr powder to a concentration of 1.5% by weight, and the constituents are combined homogeneously with one another. A tablet-shaped sample chamber (diameter: about 0.8 cm, depth: about 2.2 mm) is filled with the pigment/KBr mixture, which is tamped down. Subsequently the diffuse reflection is measured in a wavelength range from 2.5 to 25 μm. This is done using, as a measuring unit, the Selector (from Specac). This instrument measures the diffuse IR reflection in a quarter-sphere geometry. The IR instrument used is an Avatac 360 spectrometer from Thermo; the detector is a DTGS detector. In every case a pure KBr powder is measured as the background spectrum, and the spectrum of the pigmented KBr is compared against it. The procedure was repeated three times and the average value of the measurements was taken.

From the IR reflection spectrum that is obtained it is possible to calculate the IR reflectance $\rho_{IR}$ by formula (1), using a temperature of 300 K with the Planck function.

In order to provide further characterization of the absorption of the substantially transparent and substantially enveloping coating, the above-described IR reflectance of a coated pigment of the invention can be related in percent terms to the IR reflectance of the uncoated IR-reflecting core (1.5% by weight concentration). This ratio is referred to in the context of this invention as "IR reflectance, coating". The ratio is preferably above 65%, more preferably above 70%, and with particular preference above 80%. With further preference this ratio is above 85% and even more preferably above 90%. As an upper limit the ratio is 99%.

The term "a substantially or largely transparent enveloping coating" refers to those coatings for which the IR-reflecting pigment of the invention has the above-specified properties in terms of its IR reflectance. The substantially or largely transparent enveloping coating preferably features the white pigments which give rise to or improve the white appearance.

The white pigments used may also have been surface-treated and may have been coated, for example, with metal oxides. In particular it is possible for $TiO_2$ pigments to have coatings of, for example, $SiO_2$, $Al_2O_3$ and/or manganese oxides and/or cerium oxides, in order to suppress the photoactivity of the $TiO_2$ pigments. Advantageously, however, the photoactivity of the $TiO_2$ pigments is suppressed by the enveloping matrix itself by which the $TiO_2$ pigments are fixed to the surface of the IR-reflecting core.

The amount of white pigment used is dependent on the type and size of the pigment and in particular on the specific surface area of the IR-reflecting core. The specific surface area of the IR-reflecting core is the surface area of the IR-reflecting core per unit weight. The specific surface area of the IR-reflecting core is determined by the known BET method.

In order to ensure sufficiently high whiteness of the IR-reflecting pigments of the invention they preferably have white pigments in an amount from 20% to 80% by weight, more preferably from 35% to 70% by weight, and with particular preference from 40% to 60% by weight, based in each case on the weight of the total IR-reflecting pigment. In this context it is preferred to use an amount of approximately 20% by weight in the case of IR-reflecting cores having low specific surface areas, and an amount of about 80% by weight in the case of IR-reflecting cores having high specific surface areas.

With amounts of below 20% by weight of white pigments, the whiteness of the IR-reflecting pigments may be too low. At amounts of more than 80% by weight there may be inadequate IR reflection, since the fraction of the IR-reflecting core, based on the total pigment, may be too low. In order to obtain effective IR reflection with the latter pigments in, say, an emulsion paint, that emulsion paint must have a correspondingly high level of pigmentation. High pigmentation, i.e., a high level of pigment of the invention in the application medium, leads on the one hand to high production costs. On the other hand it may also result in overpigmentation and hence in poor performance properties on the part of these emulsion paints.

IR-reflecting cores used are preferably metal powders and/or platelet-shaped metal pigments and/or suitable pearlescent pigments. Particular preference is given in this context to platelet-shaped metal pigments, since on account of their shaping and their optical properties, in the case of preferably plane-parallel orientation in the application medium, they exhibit the highest IR reflection. The metal pigments are opaque both to optical light and to IR radiation. Even on nonplanar substrates, such as woodchip wallpapers, for example, platelet-shaped metal pigments bring about the most effective directed and/or diffuse reflection of incident IR radiation.

Platelet-shaped metal pigments or metal powders employed are preferably aluminum, copper, zinc, titanium, iron, silver and/or alloys of these metals. Particular preference is given to aluminum and to alloys of aluminum, on account of their extremely high IR reflection and the ready availability of these metal pigments. The platelet-shaped metal pigments are also referred to in accordance with the invention as metallic effect pigments.

The dimensions of the length and width of the platelet-shaped pigments, preferably metal pigments or metallic effect pigments, are preferably between 3 and 200 μm, more preferably between 12 and 90 μm, more preferably still between 20 and 75 μm, and with particular preference between 40 and 70 μm.

The average thickness of the platelet-shaped pigments, preferably metal pigments or metallic effect pigments, is preferably between 0.04 and 4 μm, more preferably between 0.1 and 3 μm, and with particular preference between 0.3 and 2 μm.

The platelet-shaped pigments, preferably metallic effect pigments, preferably have specific surface areas of about 0.2 to about 15 $m^2/g$. Metal pigments or metallic effect pigments with a length or width below 3 μm exhibit excessive scattering in the optical range and therefore appear too gray even after coloring with a white pigment. Moreover, pigments of this size no longer provide optimum reflection of the IR radiation, since in this case the pigments are already smaller than the wavelength of the IR light to be reflected. Furthermore, on account of their high specific surface area, these metal pigments or metallic effect pigments can no longer be fully coated with white pigments or can no longer tie the white pigments correspondingly into a coating. Above a length or a width of 200 μm, the opacity achieved by the pigments in respect of the IR-reflecting metal fraction, and hence the IR reflection, in an applied wall paint or a varnish, for example, is inadequate. Moreover, in spite of their white appearance, pigments with sizes of more than 200 μm can be perceived even to the eye as particles, which is undesirable. Furthermore, in the case of a pigment size of more than 200 μm, agglomerates, and hence the formation of bits, are likely.

The platelet-shaped metal pigments may be present in a prepassivated form. Examples of such are $SiO_2$-coated aluminum pigments (Hydrolan®, PCX or PCS®, Eckart) or chromated aluminum pigments (Hydrolux®, Eckart). Using substrates prestabilized in this way maximizes the stabilities in terms of the gassing stability in an aqueous paint, more particularly an emulsion paint, and also, possibly, the corrosion stabilities in the exterior sector.

In the case of another preferred embodiment, the platelet-shaped pigments, preferably metal pigments, possess lengthwise dimensions of 5 to 12 μm. Pigments of this kind are used predominantly as white, opaque pigments. In this case relatively small metal pigments are used as the core in order to obtain high opacity.

In another preferred case of platelet-shaped metal pigments, and more particularly of aluminum pigments, as the IR-reflecting core, the amount of white pigment applied to the preferably platelet-shaped metal pigment, per 1 $m^2$ surface area of the IR-reflecting metal core, is preferably 0.3 to 10 g, more preferably 0.5 to 7 g, with further, particular preference 1 to 3 g, and with particular preference 1.5 to 2.5 g.

Below 0.3 $g/m^2$ substrate surface area, the coating of the preferably platelet-shaped metal pigment with the white pigment may be too low to impart a satisfactory white effect. Above 10 $g/m^2$ the white effect is practically saturated and the fraction of the IR-reflecting core as a proportion of the total pigment may be too low, with the consequence that a pigment of the invention of this kind may no longer exhibit sufficient IR reflectivity.

As IR-reflecting cores it is additionally possible to use metal powders. Suitable powders preferably have an approximately spherical morphology with an average diameter of preferably 8 to 1000 μm, more preferably 10 to 500 μm, and with particular preference 20 to 300 μm. Irregularly shaped metal particles, however, can also be used as IR-reflecting cores.

As IR-reflecting cores it is also possible to use pearlescent pigments. These pearlescent pigments preferably have a low-refractive-index core, such as mica, glass, $SiO_2$ or $Al_2O_3$ flakes, coated with high-index oxides such as $TiO_2$ and/or $Fe_2O_3$. Examples of $SiO_2$ flakes coated with $TiO_2$ and/or $Fe_2O_3$ are known under the Colorstream® name, and examples of corresponding $Al_2O_3$ flakes under the Xirallic® name, and are both produced by Merck, Darmstadt, Germany. Given appropriate optical thicknesses of the high-index coat, the interference conditions result in large reflection of the IR radiation. The suitable optical thicknesses are set as a function of the refractive indices of the high-index oxide.

The pigments of the invention preferably possess high reflection in the IR range from 4 to 25 μm, more preferably from 5 to 15 μm, and with further preference from 8 to 12 μm. It has emerged that an optimum feel-good ambience in the interior of a room is generated if there are high reflections, preferably even reflection maxima, within the aforementioned ranges, since in that case the pigments of the invention effect optimum reflection of a person's IR radiation. Accordingly the pigments of the invention are suitable more particularly for use for wall paints which are applied in interior rooms.

Furthermore, extremely advantageously, rooms whose interior walls have been provided with the pigments of the invention do not have to be heated so greatly in winter, owing to the IR reflectivity of the pigments of the invention. Accordingly the pigments of the invention make it possible to save energy, which signifies a great advance from both an environmental and an economic standpoint, in view of increasingly scarce energy resources and continually increasing energy costs.

Examples of pearlescent pigments which can be used as IR-reflecting cores are the pearlescent pigments produced by Merck, Darmstadt, Germany and sold under the brand names Solarflair® or Minatec®.

Using platelet-shaped cores as an IR-reflecting component in the pigments of the invention optimizes IR reflection in relation to the amount of IR-reflecting material used. In the case of platelet-shaped cores, a very great improvement is obtained, on the one hand, in the opacity properties of pigments, preferably of metal pigments, as compared, for example, with spherical pigments such as metal beads, for example. On the other hand, in comparison to spherical pigments, the reflectivity of platelet-shaped pigments, preferably metal pigments, is greater by virtue of the greater reflection area.

As IR-reflecting cores it is preferred to use effect pigments, examples being metallic effect pigments or pearlescent pigments, since these pigments, on account of their platelet form, are particularly suitable in respect of opacity and reflectivity in the context of the present invention.

Effect pigments typically have an optical appearance which is dependent on the angle of incidence and/or viewing. The optical effects may encompass changes in lightness in the case of metal pigments, which are also referred to as "flop", and color changes in the case of pearlescent effect pigments, which are also referred to as "color flops".

A typical feature of application media, such as inks, paints or varnishes, which comprise effect pigments are their high gloss values. Metal powders, in contrast, in application media such as inks, paints or varnishes, always give rise in optical terms to severe graying, which goes hand in hand with low lightness.

These optical effects which typically occur when effect pigments are used, pearlescent pigments or metallic effect pigments for example, or when metal powders are used are largely suppressed in the case of the pigments of the invention. To the human eye the pigments of the invention have a largely white appearance.

It has emerged that, when pearlescent pigments are used as an IR-reflecting core, the desired whiteness is relatively easy to achieve in comparison to metallic effect pigments. With metallic effect pigments, however, the IR reflection is far higher. Consequently, metallic effect pigments are preferred as an IR-reflecting core in the pigments of the invention, despite the fact that the amount of IR-transparent white pigments for application to the metal pigments is greater. Platelet-shaped aluminum pigments are particularly preferred in this context.

A largely white IR-reflecting pigment of the invention that has no marked metallic effect to the human eye or has a color effect which is different from the color white, preferably meets the following criteria:

With the pigment of the invention, preferably a metallic effect pigment, the parameters of gloss, chroma C*, flopindex, and the lightness L*, measured in each case at a constant incident angle of 45°, are preferably situated within defined ranges of values. Even the sparkle effect that frequently occurs in the case of effect pigments is largely suppressed. This sparkle effect, however, cannot be measured by colorimetry and can therefore only be assessed visually.

In order to be able to determine these parameters comparatively, the approach taken is as follows: on the one hand, the pigments of the invention are incorporated into an otherwise unpigmented conventional varnish based on a polyester/CAB system (binders: 22% by weight CAB 381-2 and 9% by weight CAB 551-0.2, both from Eastman, and 13% by weight Viacryl SC 303, from Surface Specialties. No other pigments or matting agents are added to this varnish, referred to below as the "test varnish", since they would influence the parameters it is intended to determine, more particularly gloss and chroma. The level of pigmentation chosen is 10% by weight, and the pigment-containing varnish is knife-coated on a black substrate. The coating knife depth is 50 µm, and in the case of very coarse pigments is 100 µm.

These knife drawdowns are used to determine the chroma, lightness values, and flop value in the context of the CieLab color system. Measurement is carried out using a multiangle colorimeter, an example being the M 682 from X-Rite, in accordance with manufacturer's indications, with a constant incident angle of 45° and with different viewing angles relative to the specular angle, and the L* and C* values are ascertained. Relevant more particularly are the viewing angles at 15°, 25°, 45°, and 110°.

For the evaluation of the color saturation, referred to as the chroma, the value to be employed is $C^*_{25°}$.

The $C^*_{25°}$ value of the knife drawdowns of the pigments of the invention is preferably within a range from 0.0 to 2.5, more preferably from 0.1 to 1.0. Values of this kind are achieved only by virtually colorless pigments.

Since in principle even certain achromatic metal pigments and also silver pearlescent pigments can achieve $C^*_{25°}$ values of this kind, it is preferred to employ further parameters for characterizing the pigments of the invention.

For the assessment of the lightness L*, in this case the value at 45° is employed. In terms of their lightness, effect pigments are frequently characterized by values close to the specular angle, i.e., at 15° or 20°. The pigments of the invention exhibit a largely angle-independent lightness, i.e., they have no significant lightness flop. A more effective differentiation from pure metal pigments or metal powders is therefore achieved in the case of median values.

The $L^*_{45°}$ values of the pigments of the invention are preferably 50 to 90 units, more preferably 55 to 80 units, and more preferably still 60 to 75 units.

The lightness flop is specified by DuPont in accordance with the following formula (A. B. J. Rodriguez, JOCCA, (1992(4)) pp. 150-153):

$$\text{Flop index} = 2.69 \times \frac{(L^*_{15°} - L^*_{110°})^{1.11}}{(L^*_{45°})^{0.86}} \quad (2)$$

The flop index shows the characteristic lightness flop more particularly of metallic effect pigments, and is less applicable to pearlescent pigments or metal powders.

The pigments of the invention possess a lightness flop of 0 to 3, preferably of 0.1 to 2, and more preferably of 0.15 to 1.0.

These extremely low values show that, for example, in the case of metallic effect pigments, the otherwise so typical lightness flop, with a flop index in a range from approximately 4 to approximately 25, is largely or completely suppressed in the case of the pigments of the invention.

One characteristic more particularly of effect pigments is the high gloss of the ink, paint or varnish coating comprising the effect pigments. Since the pigments of the invention no longer exhibit these characteristic optical gloss properties of effect pigments, the drawdowns possess very low gloss values.

The criterion employed here is the gloss at 60°, which was measured using a Trigloss instrument from Byk-Gardner, Germany, in accordance with the manufacturer's instructions. The pigments of the invention possess a gloss of 1 to 12, preferably of 1.5 to 10, units. With effect pigments the gloss is typically situated within a range from approximately 30 to 160.

A further criterion for the largely white appearance of the pigment of the invention can be determined on the basis of its appearance in a commercially available white emulsion paint. In this case a comparison is made between the pigments of the invention and the IR-reflecting pigments with no coating and/or with no white pigment coating. The lightness of correspondingly pigmented emulsion paints is measured in diffuse reflection. The level of pigmentation of the IR-reflected core in this case is 10% by weight, based on the total emulsion paint. Subsequently the difference of the corresponding lightnesses is formed:

$$\Delta L^*\text{diffuse} = L^*_{\text{diffuse, white pigment}} - L^*_{\text{diffuse, no white pigment}}.$$

This difference ought preferably to be greater than 1.5 units, preferably greater than 3 units, and more preferably greater than 7 units.

This difference in lightness, however, cannot be used alone to assess the whiteness. For instance, metal pigments always produce a sharp increase in lightness, without being therefore white. Ultimately here, therefore, it is still always the visual impression which is decisive.

The coating substantially transparent to IR radiation that largely envelopes not only the core but also the white pigments constitutes a matrix which is largely colorless from an optical standpoint. It comprises or consists preferably of metal oxides and/or organic polymers. The white pigments may also be applied on the enveloping coating or matrix. The matrix is preferably largely colorless, in order not to adversely affect the white effect produced by the applied or incorporated white pigments.

By largely colorless is meant, in accordance with the invention, that the metal oxides and/or organic polymers have no substantial inherent coloration that cannot be masked by the white effect generated by the white pigments.

If the core is composed of a metal pigment, then the largely colorless matrix material is preferably a metal oxide, since in this way the core can be protected very well from corrosion. The metal oxide to be used for the matrix material, and the amount of that oxide, are selected more particularly under the consideration that the pigment of the invention should absorb IR radiation to as small an extent as possible. Any IR absorption on the part of the pigments of the invention results in reduced IR reflection and hence weakens the desired effect of the pigments of the invention. The matrix material brings about adhesion of the white pigments on the IR-reflecting core, and so, even after dispersion into the emulsion paint, the white pigments remain largely adhering to the IR-reflecting core. It is only this reliable attachment that allows the optical phenomena typical of effect pigments to be suppressed, and permits the largely white appearance.

Examples of very suitable metal oxides are titanium dioxide, silicon dioxide, aluminum oxide/hydroxide, boron oxide/hydroxide, zirconium oxide or mixtures thereof. Silicon dioxide is particularly preferred.

As organic polymers it is preferred to use those which are also employed as binders in varnishes, emulsion paints or printing inks. Examples thereof are polyurethanes, polyesters, polyacrylates and/or polymethacrylates. It has emerged that the effect pigments of the invention can be incorporated very effectively into binders if the organic coating and the binder are very similar to one another or identical.

The optically largely colorless matrix is present preferably in a fraction of 4% to 40% by weight, based on the weight of the total pigment. The fraction is preferably 5% to 20% and more preferably 6% to 15% by weight. Surprisingly it is possible, with such small amounts of matrix material, not only to anchor the white pigments firmly and uniformly on the surface of the cores but also, in the case of metallic cores, to achieve corrosion stability on the part of these cores. At a fraction below 4% by weight it may be the case that the pigments are not anchored with sufficient firmness on the surface of the IR-reflecting core. It may be the case, moreover, that, with metallic cores, the requisite corrosion stability, which requires very substantially complete envelopment of the cores with the matrix, is not sufficiently provided at these low quantities. In the case of amounts above 40% by weight it may be the case that not only the IR reflection but also the whiteness of the pigments are too low. It may be the case, furthermore, that the IR absorption undergoes an unfavorable increase as a result of the matrix material.

In one particularly preferred embodiment the IR-reflecting core is composed of aluminum and the optically largely colorless matrix is composed of $SiO_2$. In addition it is preferred for the white pigment to be $TiO_2$, ZnS and/or ZnO, which preferably have an average primary particle size of 250 to 370 nm and with particular preference of 250 to 320 nm.

Aluminum possesses the highest IR reflection and is very readily available commercially. $SiO_2$ is outstandingly suitable for providing the aluminum with corrosion stabilization, and $TiO_2$, on account of its high refractive index, is a very good white pigment, and is likewise very readily available commercially. Furthermore it has been found, surprisingly, that ZnS particles or ZnO particles, more particularly having a primary particle size in the range from 250 to 370 nm and with particular preference from 250 to 320 nm, absorb IR radiation hardly at all and are therefore especially suitable in the context of the present invention.

In accordance with a further preferred embodiment the pigments of the invention have an organic surface modification. The pigments of the invention are preferably modified with leafing promoter agents. The leafing promoter agents produce floating of the pigments of the invention on the surface of the application medium, an ink or paint for example, preferably an emulsion paint, a varnish or a cosmetic. By virtue of the fact that the pigments of the invention are ordered at the surface of the application medium, the IR reflectivity in the applied state is improved, since the IR radiation is reflected right at the surface of the application medium and does not first have to penetrate the application medium, in which case there may be absorption losses.

The pigments of the invention are preferably surface-modified with long-chain saturated fatty acids such as stearic acid, for example, or palmitic acid or with long-chain alkylsilanes having 8 to 30 C atoms, preferably 12 to 24 C atoms, or with long-chain phosphoric acids or phosphoric acids or their esters and/or with long-chain amines.

In the case of a further embodiment according to the invention the pigmentlike particles are composed not of individual, commercially available white pigments but instead of particlelike outgrowths of a coating material having a refractive index >2.0. In this case the coating may be composed first of a smooth layer of this high-index material, but which then, in terms of its morphology, increasingly adopts a particulate form on the side of the coating facing away from the IR-reflecting core. Forms of this kind may be represented, for example, in a kind of "cauliflower structure" if the pigments are investigated by scanning-electron methods. Preference is given here to layers and particlelike coating outgrowths of $TiO_2$.

The pigments of the invention can be produced by applying a coating which is substantially transparent to IR radiation, together with white pigments and/or particlelike coating outgrowths that scatter visible light, to an IR-reflecting core.

The coating preferably envelopes the IR-reflecting core substantially completely, with further preference completely. The white pigments which are substantially transparent to IR radiation and/or particlelike coating outgrowths that scatter visible light are applied in and/or on the coating.

In order to avoid repetition in respect of the pigment of the invention produced in accordance with the processes of the invention, reference is made to the above elucidations, which apply correspondingly to the process of the invention.

In one preferred variant of the process the white pigments that are substantially transparent to IR radiation are precipitated envelopingly around the core together with metal oxide, using wet-chemical sol-gel processes, with the consequence that the white pigments are substantially imbedded in the metal oxide layer.

One preferred variant of the process encompasses the following steps:

a) dispersing the platelet-shaped IR-reflecting pigment core in a solvent, preferably in an organic solvent;

b) adding water, a metal alkoxy compound and, if desired, catalyst, with optional heating in order to accelerate the reaction;

c) adding the IR-transparent white pigment, preferably in the form of a dispersion in a solvent, more preferably in organic solvent.

After the end of the reaction the pigment of the invention, i.e., the platelet-shaped IR-reflecting core coated with white pigments and metal oxide, can be separated from unreacted starting materials and from the solvent. After that it is possible for drying and, optionally, size classification to take place.

As a metal alkoxy compound it is preferred to use tetraalkoxysilanes such as tetramethoxysilane or tetraethoxysilane, in order to effect precipitation of an SiO₂ layer, with white pigments preferably imbedded in it, onto and preferably enveloping the core.

As organic solvents it is preferred to use water-miscible solvents. Particular preference is given to using alcohols such as, for example, methanol, ethanol, n-propanol, isopropanol, n-butanol, isobutanol or tert-butanol.

The amount of water ought preferably to be between 1.5 times and 30 times the amount required by stoichiometry for the sol-gel reaction. The amount of water is preferably between 2 times and 10 times the stoichiometrically required amount.

Below 1.5 times the stoichiometrically required amount, the reaction rate of the sol-gel process is too slow, and above 30 times the stoichiometrically required amount the formation of a coat may not be sufficiently uniform.

The reaction temperature during the sol-gel reaction is preferably between 40° C. and the boiling temperature of the solvent used.

In the context of the sol-gel reaction it is possible as catalysts to use weak acids or bases.

Acids used are preferably organic acids such as acetic acid, oxalic acid, formic acid, etc., for example.

Bases used are preferably amines. Examples thereof are as follows: ammonia, hydrazine, methylamine, ethylamine, triethanolamine, dimethylamine, diethylamine, methylethylamine, trimethylamine, triethylamine, ethylenediamine, trimethylenediamine, tetramethylenediamine, 1-propylamine, 2-propylamine, 1-butylamine, 2-butylamine, 1-propylmethylamine, 2-propylmethylamine, 1-butylmethylamine, 2-butylmethylamine, 1-propylethylamine, 2-propylethylamine, 1-butylethylamine, 2-butylethylamine, piperazine and/or pyridine.

The white pigments can be comminuted mechanically, preferably prior to the addition to the coating suspension, in order to have as many primary particles present as possible. This may take place, as is typical, in an organic solvent, where appropriate with the addition of suitable dispersing additives and/or binders. The comminution may take place in the typical assemblies, such as a triple-roll mill, co-ball mill, toothed-wheel dispersing mill, etc, for example.

In the case of another embodiment of the process of the invention the pigments of the invention are produced by a spray-drying process.

With this variant of the process a dispersion comprising a highly volatile, preferably organic, solvent, IR-reflecting cores, IR-transparent white pigments with an average size of preferably 180 to 400 nm, and an organic, preferably film-forming, binder together is sprayed and is dried in the course of the spraying. The spray drying is carried out preferably in an agitated atmosphere, such as in a fluidized bed, for example, in order to prevent agglomeration. In the course of spray-drying, the cores are coated uniformly with the organic, preferably film-forming, binder and with the white pigments. After drying, the organic, preferably film-forming, binder can be cured. This can be done preferably likewise in the spray-drying apparatus, by means, for example, of the temperature of the feed gas being above the curing temperature of the binder.

In another embodiment of the process of the invention the IR-reflecting, preferably platelet-shaped, pigment of the invention can be obtained by coating the IR-reflecting cores with a matrix comprising suitable starting compounds and white pigments in a fluidized-bed process.

The IR-reflecting, preferably platelet-shaped, pigments of the invention are used preferably in inks, paints, varnishes, printing inks, security-printing inks, and cosmetics.

The IR-reflecting, preferably platelet-shaped, pigments of the invention are used preferably in emulsion paints for the interior or exterior sector.

Application media pigmented with the pigments of the invention, emulsion paints for example, possess a largely white appearance. The whiteness of these application media may where appropriate be increased further by means of further addition of white pigments such as TiO₂ or else of fillers. Furthermore, by tinting with colorants such as organic or inorganic color pigments, it is possible to produce colored emulsion paints.

In order to maximize the IR emittance of a wall painted, for example, with an emulsion paint, it is preferred for the emulsion paint to contain the pigments of the invention in an amount such that the fraction of the IR-reflecting cores, based on the weight of all the nonvolatile components of the emulsion paint, is 2% to 30%, preferably 4% to 20%, and more preferably 7% to 15% by weight.

With emulsion paints pigmented with the pigments of the invention, coatings are possible which possess IR emittances of below 0.5, preferably below 0.4, and more preferably below 0.3. The lower limit of the emission in this case is approximately 0.2.

The degree of IR emittance is defined as follows:

$$\text{emittance} = 1 - \text{reflectivity} \quad (3)$$

For comparison with this, a conventionally applied wall paint possesses an emittance of approximately 0.9; in other words, only about 10% of the IR radiation is reflected, and 90% of the IR radiation is absorbed or transmitted by the wall paint and, ultimately, is lost in the form of heat.

In order to be able to minimize emittances or maximize reflectances it is preferred for the further components of the emulsion paint, such as binders or fillers, for example, likewise to have a very low IR absorption. In addition, owing to the additional pigmentation by the pigments of the invention, the levels of pigmentation of the binders, fillers and/or white pigments may be significantly lower than is typical in the art.

In further embodiments, the IR-reflecting, preferably platelet-shaped, pigments of the invention are used preferably as a very opaque white pigment in coating materials, preferably in colored coating materials, and very preferably in colored industrial coatings.

In the context of this use the core used is preferably a platelet-shaped aluminum pigment having an average size of 5 to 12 μm, the white pigment used is preferably TiO₂, ZnS and/or ZnO with a preferred diameter of 250 to 320 nm, and the matrix used is preferably SiO₂. In the context of application in an industrial coating, a primary place is occupied not only by the IR-reflecting properties of the pigment but also, more particularly, by the outstanding opacity of the platelet-shaped aluminum core in the optical range.

Colored industrial coatings are often pigmented with large quantities of expensive colored pigments, but on account of the transparency of those pigments possess inadequate opacity. The addition of white pigments such as TiO₂ does improve the opacity, but inevitably leads to a lighter shade. If the pigments of the invention are added to an industrial coating, then, advantageously, the opacity can be distinctly improved even at very low levels of pigmentation, i.e., with small quantities added, without having to accept any substantial lightening of the coating. Hence the pigments of the invention, for applications in a varnish or industrial coating, are used at pigmentation levels of 0.1% to 4% by weight, preferably of 0.2% to 1.5% by weight, and more preferably of 0.3% to 1.0% by weight, based in each case on the weight of the total formulation.

The examples which follow serve to elucidate the invention, without restricting it in any way whatsoever.

EXAMPLES

Inventive Example 1

100 g of aluminum powder (Reflexal 145, $d_{50}$=145 µm) are dispersed with stirring in 250 ml of isopropanol and the solvent is brought to boiling under reflux. Then 17 g of tetraethoxysilane and, 2 minutes later 1.7 g of ethylenediamine in 50 g of fully demineralized water are added. In a separate vessel, 200 g of $TiO_2$ pigment (Kronos 2310, average primary particle size: 300 nm; Kronos Titan, Friedrichstadt, Germany) are dispersed with stirring in 50 g of tetraethoxysilane. After a reaction time of one hour, this dispersion is added continuously over the course of an hour to the aluminum pigment suspension. Half an hour later, 1 g of ethylenediamine in solution in 20 g of isopropanol is added. One hour later, 2.5 g of ethylenediamine in solution in 20 g of isopropanol are added. The reaction mixture is left to boil for a further 4 hours and then cooled to room temperature. The next day, the aluminum pigment coated with $SiO_2$ and the white pigment is filtered off on a Büchner funnel, washed repeatedly with isopropanol, and dried in an oven at 80° C. under reduced pressure.

Inventive Example 2

141 g of aluminum paste (Stapa Metalux 274, $d_{50}$=33 µm) are dispersed with stirring in 250 ml of isopropanol and the solvent is brought to boiling under reflux. Then 17 g of tetraethoxysilane and, 2 minutes later 1.7 g of ethylenediamine (EDA) in 50 g of fully demineralized water are added. In a separate vessel, 100 g of $TiO_2$ pigment (Kronos 2310) are dispersed with stirring in 50 g of tetraethoxysilane. After a reaction time of one hour, this dispersion is added continuously over the course of an hour to the aluminum pigment suspension. Half an hour later, 1 g of ethylenediamine in solution in 20 g of isopropanol is added. One hour later, 2.5 g of ethylenediamine in solution in 20 g of isopropanol are added. The reaction mixture is left to boil for a further 4 hours and then cooled to room temperature. The next day, the aluminum pigment coated with $SiO_2$ and the white pigment is filtered off on a Büchner funnel, washed repeatedly with isopropanol, and dried in an oven at 80° C. under reduced pressure.

Comparative Example 3

Commercially available aluminum powder Reflexal 145, $d_{50}$=145 µm (ECKART GmbH & Co. KG). Starting material for inventive example 1.

Comparative Example 4

Commercially available aluminum paste Stapa Metalux 274, $d_{50}$=33 µm (ECKART GmbH & Co. KG). Starting material for inventive example 2.

Comparative Example 5

Commercially available aluminum powder PCS 3500 (ECKART). This is an $SiO_2$-coated aluminum pigment with a very similar particle fraction to MEX 274 of comparative example 4.

Inventive Example 6

141 g of aluminum paste (Stapa Metalux 274, $d_{50}$=33 µm) are dispersed with stirring in 250 ml of isopropanol and the solvent is brought to boiling under reflux. Then 17 g of tetraethoxysilane and, 2 minutes later 1.7 g of ethylenediamine (EDA) in 50 g of fully demineralized water are added. In a separate vessel, 100 g of ZnS pigment (Sachtolith L; Sachtleben; average particle size: 0.35 µm) are dispersed with stirring in 50 g of tetraethoxysilane. After a reaction time of one hour, this dispersion is added continuously over the course of an hour to the aluminum pigment suspension. Half an hour later, 1 g of ethylenediamine in solution in 20 g of isopropanol is added. One hour later, 2.5 g of ethylenediamine in solution in 20 g of isopropanol are added. The reaction mixture is left to boil for a further 4 hours and then cooled to room temperature. The next day, the aluminum pigment coated with $SiO_2$ and the white pigment is filtered off on a Büchner funnel, washed repeatedly with isopropanol, and dried in an oven at 80° C. under reduced pressure.

Inventive Example 7

1 part of Standart® Reflexal 214 (ECKART GmbH & Co. KG) is incorporated with stirring into 4 parts of acetone, and then 1 part of a ground bulk polymer based on methyl methacrylate (Degalan M 527; Degussa) and 1 part of Kronos 2310 are added and the mixture is stirred until the polymer has dissolved completely.

The resulting suspension is sprayed via a spray-drying apparatus at temperatures above 60° C.

The resulting pigment is in the form of a white, nonlustrous powder.

Inventive Example 8

1 part of Standart® Reflexal 214 (ECKART GmbH & Co. KG) is incorporated with stirring into 4 parts of acetone, and then 1 part of a ground bulk polymer based on methyl methacrylate and 1 part of ZnS (Sachtolith L; Sachtleben; average particle size: 0.35 µm) as white pigment are added and the mixture is stirred until the polymer has dissolved completely.

The resulting suspension is sprayed via a spray-drying apparatus at temperatures above 60° C.

The resulting pigment is in the form of a white, nonlustrous powder.

Comparative Example 9

1 part of Standart® Reflexal 214 (ECKART GmbH & Co. KG) is mixed with 1 part of Kronos 2310 white pigment by means of a centrifugal mixing assembly (DAC 400 FWC from Hausschild; Hamm) at 1000 rpm for 5 minutes.

The pigments of examples 1 to 9 were incorporated into an otherwise unpigmented conventional varnish based on a polyester/CAB system (binders: 22% by weight CAB 381-2 and 9% by weight CAB 551-0.2, both from Eastman, and 13% by weight Viacryl SC 303, from SurfaceSpecialities). The level of pigmentation was in each case 10% by weight, based on the total varnish. Using a 50 µm coating knife, drawdowns were prepared and subjected to colorimetric measurement. Gloss values were determined by means of the Tri-Gloss gloss meter from Byk-Gardner at 60° C., and the L,a,b values were determined at the observation angles of 15°, 25°, 45°, and 110° C. (M 682, X-Rite). These values were used to calculate the flop index in accordance with formula (2) and, in conventional manner, the chroma at 25°. The results are shown in Table 1:

TABLE 1

Colorimetric characteristics of the examples in knife drawdowns from a conventional unpigmented polyester/CAB system.

| Sample | Gloss 60° | L* 45° | C* 25° | DuPont flop index | Al fraction in the varnish |
|---|---|---|---|---|---|
| Inventive example 1 | 2.5 | 59.0 | 2.8 | 1.6 | 5.0 |
| Inventive example 2 | 10.9 | 65.9 | 1.8 | 0.9 | 5.0 |
| Comparative example 3 | 41.6 | 37.1 | 5.1 | 16.5 | 10.0 |
| Comparative example 4 | 42.9 | 48.1 | 2.6 | 20.0 | 10.0 |
| Comparative example 5 | 40.1 | 46.9 | 2.5 | 20.3 | 10.0 |
| Inventive example 6 | 10.8 | 63.7 | 0.5 | 1.6 | 5.0 |
| Inventive example 7 | 2.4 | 70.7 | 2.3 | 0.8 | 3.3 |
| Inventive example 8 | 2.5 | 62.1 | 0.3 | 1.9 | 3.3 |
| Comparative example 9 | 13.9 | 69.7 | 1.6 | 3.7 | 5.0 |

All of the samples according to the invention have a similarly low chroma C*25°, since the chroma of metal pigments is low per se on account of their achromaticity. In the lightness flop index and in the gloss, the inventive examples have much lower values in comparison to comparative examples 3-5; the lightness flop, in particular, has disappeared almost completely. In contrast, in inventive examples, the lightness L*45° is much higher than in the case of comparative examples 3-5. The reason for this is that a white pigment is generally associated with a relatively high lightness, and in the case of a metal pigment, at this angle of observation, the lightness has already fallen distinctly as a result of the flop.

Comparative example 9 has similar values for gloss, L*$_{45°}$, chroma, and lightness flop as the inventive examples. The degrees of gloss, however, are somewhat higher. The purely physical mixture of white pigments and aluminum pigments here has an apparently similar appearance to the inventive examples. Nevertheless, this mixture appears far less white and induces a greater "metallic" sensation in the observer.

In order to illustrate this, all of the pigments of examples 1 to 9 were incorporated into the commercially available wall paint Krautol® at different levels of pigmentation. An optically opaque knife drawdown was produced (100 μm knife depth) of each of these paints, and, as a blank specimen, a knife drawdown without pigmentation with an IR-reflecting pigment. To determine the "whiteness" of the pigments, the lightness of all of the drawdowns was measured in diffuse reflection geometry (Minolta CR 410, Minolta). For comparison, the uncoated aluminum pigment and, respectively, an SiO$_2$-coated aluminum pigment of comparative particle size were incorporated into the wall paint (level of pigmentation: 10% by weight). In the case of comparative example 4 it was necessary to wash the pigment, which was in a white spirit paste, with acetone beforehand, since otherwise it was not possible to incorporate it into the aqueous wall paint. The results are shown in FIG. 1.

From FIG. 1 it is apparent that the lightness and therefore the whiteness decrease as the concentration of the pigments goes up. The lightnesses of the pure, uncoated pigments (comparative examples 3 and 4) and of the pigments coated without white pigment (comparative example 5) of the comparative examples are always smaller than those of the inventive examples. Of particular interest is the comparison of the lightnesses in light of the overall-identical metal content in the knife drawdown. The arrows mark this comparison in each case. Here it is evident that, in the inventive examples, the pigments of the invention consistently possess a lightness higher by more than one unit. In visual terms, this is manifested in a significantly higher whiteness. This difference, and also the visually perceived sparkle behavior, have been set out briefly in Tab. 2. The visually assessed sparkle and white sensations were evaluated in accordance with a five-point scale:

very strong
strong
moderate
weak
very weak

TABLE 2

Diffuse lightnesses, visual sparkle and white sensation in pigmented emulsion paint (whiteness)

| Sample | L*$_{diffuse}$ (10% metal content) | ΔL*$_{diffuse}$ = L*$_{diffuse, white\ pigment}$ − L*$_{diffuse, no\ white\ pigment}$ | Visual sparkle sensation | Visual white sensation |
|---|---|---|---|---|
| Inventive example 1 | 95.6 | 1.9 | weak | very strong |
| Comparative example 3 | 93.7 | 0 | very strong | very strong |
| Inventive example 2 | 89.2 | 5.4 | very weak | very strong |
| Comparative example 4 | 83.8 | 0.0 | strong | moderate |
| Comparative example 5 | 85.0 | 1.2 | strong | moderate |
| Inventive example 6 | 89.1 | 5.3 | weak | strong |
| Inventive example 7 | 88.4 | 4.6 | very weak | strong |
| Inventive example 8 | 88.1 | 4.3 | weak | strong |
| Comparative example 9 | 88.5 | 4.7 | strong | weak |

The visually assessed sparkle sensation is weakly or very weakly pronounced in the case of the pigments of the inventive examples. In the knife drawdowns, in contrast, the non-white-colored metal pigments of the comparative examples exhibit a pronounced sparkle behavior. This is because they are very large pigments, which can be perceived individually by the human eye within a paint. The same is true of the comparative example 9, which in the colorimetric characterizations still showed very similar values to the inventive examples.

The calculated lightness differences are above a value of 1.5 in the case of the pigments of the invention of the inventive examples. The pigment of comparative example 5 (pigments with SiO$_2$ coating) likewise show a positive ΔL* value in comparison to the completely uncoated metal pigment, but the whiteness is not quite as high.

The ΔL* values measured appear low, but the human eye is very sensitive specifically to the sensation of a white impression. In visual terms, therefore, it is possible to perceive very distinct differences between the emulsion paint pigmented with the pigments of the invention and the emulsion paint pigmented with the uncoated pigments.

Hence the visually assessed whiteness of the inventive examples is consistently strong to very strong. The comparative example 9, in contrast, shows only a moderate whiteness. The graying tendency of the uncoated aluminum pigments is manifested more strongly here. The same applies to comparative examples 4 and 5, while 2 evokes a very strong white sensation. In that case the very coarse aluminum pigment appears to possess little graying tendency on account of its poor opacity.

Measurement of the Diffuse IR Reflection:

In the case of the pigments of the examples (except for comparative example 5), IR spectra were measured in diffuse reflection. For this purpose, first of all, KBr powder was comminuted in a mortar. Then pigment was added to the KBr in a concentration of 1.5% by weight and the constituents were mixed homogeneously with one another. A tablet-shaped sample chamber (diameter: about 0.8 cm, depth: about 2.2 mm) was filled with the KBr/pigment mixture, which was tamped down. Subsequently the diffuse reflection was measured in a wavelength range from 2.5 to 25 µm. This was done using, as a measuring unit, the Selector (Specac). This instrument measures the diffuse IR reflection in a quarter-sphere geometry. The IR instrument used was an Avatac 360 spectrometer from Thermo; the detector was a DTGS detector. In each case a pure KBr powder was measured as the background spectrum, and the spectrum of the KBr/pigment mixture was compared against it. The process is repeated three times and the average of the measurements is taken.

FIGS. 2 and 3 depict the spectra of a number of inventive and comparative examples and plotted additionally (without scale) is the calculated Planck radiation function at 300 K. In FIG. 2 the spectra of the inventive and comparative examples are shown with coarse pigments ($D_{50}$=about 145 µm), and in FIG. 3 with the finer pigments ($D_{50}$=about 35 µm).

A comparison of the spectra of FIG. 2 shows that the pigments of inventive example 1 possess a lower reflection than the uncoated metal pigment of comparative example 3. This can be attributed to a certain degree of IR absorption by the $TiO_2$ pigments and the $SiO_2$ matrix of the coating. Overall, nevertheless, the reflection is high enough to produce an IR-reflecting pigment. Similar circumstances can be observed in FIG. 3 for the finer pigments. In this case the reflection and the reflectance, more particularly for inventive example 6, are significantly higher than for examples 2 or 4. This can be attributed to the low IR absorption of ZnS pigments in comparison to $TiO_2$ pigments.

This can be understood by reference to Tab. 3. Here, from the spectral IR reflection spectra obtained, the reflectance the IR reflectivity was calculated by formula (1), using a temperature of 300 K for the Planck function.

TABLE 3

Evaluation of diffuse IR spectra

| Sample | IR reflectance (2.5 to 25 µm) [%] | IR reflectance, coating |
|---|---|---|
| Inventive example 1 | 63.4 | 71.5% |
| Inventive example 2 | 62.3 | 76.6% |
| Comparative example 3 | 88.7 | 100% |
| Comparative example 4 | 81.3 | 100% |
| Comparative example 5 | / | / |
| Inventive example 6 | 79.8 | 98.2% |
| Inventive example 7 | / | / |
| Inventive example 8 | / | / |
| Inventive example 9 | 59.7 | 73.4% |

The pigments of the inventive examples possess an IR reflectance of significantly more than 50%. The influence of the coatings on the IR reflectivity is relatively low, as may be inferred from the high values of more than 71% for the IR reflectance, coating. Particularly in the case of inventive example 6 the influence of the coating is only very small.

The advantages of the pigment of the invention are therefore to be seen in a joint viewing of high IR reflectivity on the one hand and white impression on the other hand.

The pigments of comparative examples 3 and 4 possess even higher reflectances, since there are no coatings present. On account of their graying effects and their distinct sparkle effect, however, these pigments cannot be used in a wall paint. In the case of comparative example 9, in contrast, the reflectance is relatively small, since here the $TiO_2$ added to the mixture effects absorption.

Consequently, in a joint consideration of high IR reflectivity, a substantially white appearance, and the absence of characteristics specific to effect pigment, such as gloss and lightness flop, the IR-reflecting pigments of the invention display advantages in relation to mixtures of uncoated effect pigments and white emulsion paints.

What is claimed is:

1. A process for producing an IR-reflecting pigment, wherein a coating which is substantially transparent to IR radiation is applied, together with white pigments, to an IR-reflecting core, wherein the IR-reflecting core is provided with a substantially enveloping coating which is substantially transparent to IR radiation and in that the IR-reflecting pigment is substantially white, wherein the IR-reflecting core is a platelet-shaped aluminum pigment and wherein the pigment reflecting IR radiation possesses a flop index of 0 to 3, said flop index being determined with the following formula $$\text{Flop index} = 2.69 \times \frac{(L^*_{15°} - L^*_{110°})^{1.11}}{(L^*_{45°})^{0.86}}$$

wherein the IR-transparent coating is $SiO_2$ and wherein the white pigments are applied together with $SiO_2$ to the IR-reflecting core by a wet chemical sol-gel process and wherein at the end of the sol-gel process the platelet-shaped IR-reflecting core coated with the white pigments and $SiO_2$ is separated from unreacted starting materials and from the solvent, and wherein the IR-reflecting pigment is dried under reduced pressure.

2. The process for producing an IR-reflecting pigment of claim 1, wherein in, on and/or under the coating that is substantially transparent to IR radiation there are white pigments.

3. The process for producing an IR-reflecting pigment of claim 2, wherein the white pigments have an average primary particle size of 180 to 400 nm.

4. The process for producing an IR-reflecting pigment of claim 2, wherein the white pigments are selected from the group consisting of titanium dioxide, zinc oxide, magnesium oxide, zinc sulfide, calcium fluoride, lithium fluoride, sodium fluoride, potassium fluoride, calcium carbonate, lithopones, magnesium carbonate, barium sulfate, barium titanate, barium ferrite, and mixtures thereof.

5. The process for producing an IR-reflecting pigment of claim 2, wherein the white pigments are $TiO_2$, ZnS and/or ZnO.

6. The process for producing an IR-reflecting pigment of claim 1, wherein the white pigments are present in an amount of 20% to 80% by weight, based on the weight of the total IR-reflecting pigment.

7. The process for producing an IR-reflecting pigment of claim 1, wherein the white pigments are arranged substantially uniformly around the IR-reflecting core.

8. The process for producing an IR-reflecting pigment of claim 1, wherein the substantially IR-transparent coating is present in a fraction of 4% to 30% by weight, based on the weight of the total IR-reflecting pigment.

9. The process for producing an IR-reflecting pigment of claim 1, wherein the platelet-shaped aluminum pigment IR-reflecting core has a size of 5 to 150 µm.

10. The process for producing an IR-reflecting pigment of claim 1, wherein the platelet-shaped aluminum pigment IR-reflecting core has a size of 5 to 12 µm.

11. The process for producing an IR-reflecting pigment of claim 1, wherein said pigment is worked into inks, paints, varnishes, printing inks, security-printing inks, or cosmetics.

12. The process for producing an IR-reflecting pigment of claim 11, wherein said paint is an emulsion paint for the interior and exterior sector.

13. The process of claim 2, wherein the white pigments have an average primary particle size of 250 to 370 nm.

14. The process of claim 2, wherein the white pigments are present in an amount of 35% to 70% by weight, based on the weight of the total IR-reflecting pigment.

15. The process of claim 7, wherein the white pigments are present in an amount of 0.3 to 10 g, per 1 $m^2$ of the surface area of the IR-reflecting core in the IR-reflecting pigment.

16. The process of claim 7, wherein the white pigments are present in an amount of 0.5 to 7 g, per 1 $m^2$ of the surface area of the IR-reflecting core in the IR-reflecting pigment.

17. The process of claim 1, wherein the white pigment is $TiO_2$, ZnS and/or ZnO.

18. The process of claim 1, wherein the white pigment has an average primary particle size of 250 to 320 nm.

19. The process of claim 1, wherein the white pigment has an average size of 180 to 400 nm.

20. A process for producing an IR-reflecting pigment wherein a coating which is substantially transparent to IR radiation is applied, together with white pigments, to an IR-reflecting core, said process consisting of the following steps, the IR-reflecting core is provided with a substantially enveloping coating which is substantially transparent to IR radiation such that the IR-reflecting pigment is substantially white, wherein the IR-reflecting core is a platelet-shaped aluminum pigment and wherein the pigment reflecting IR radiation possesses a flop index of 0 to 3, said flop index being determined with the following formula $$\text{Flop index} = 2.69 \times \frac{(L^*_{15°} - L^*_{110°})^{1.11}}{(L^*_{45°})^{0.86}}$$

wherein the IR-transparent coating is $SiO_2$, wherein the white pigments are applied together with $SiO_2$ to the IR-reflecting core by a wet chemical sol-gel process, wherein at the end of the sol-gel process the platelet-shaped IR-reflecting core coated with the white pigments and $SiO_2$ is separated from unreacted starting materials and from the solvent, wherein the IR-reflecting pigment is dried under reduced pressure, and wherein optionally an organic surface modification is carried out on said pigment.

21. The process for producing an IR-reflecting pigment of claim 20, wherein the white pigments have an average primary particle size of 180 to 400 nm.

22. The process for producing an IR-reflecting pigment of claim 20, wherein the white pigments are selected from the group consisting of titanium dioxide, zinc oxide, magnesium oxide, zinc sulfide, calcium fluoride, lithium fluoride, sodium fluoride, potassium fluoride, calcium carbonate, lithopones, magnesium carbonate, barium sulfate, barium titanate, barium ferrite, and mixtures thereof.

23. The process for producing an IR-reflecting pigment of claim 20, wherein the white pigments are at least one selected from the group consisting of $TiO_2$, ZnS and ZnO.

24. The process for producing an IR-reflecting pigment of claim 20, wherein the white pigments are present in an amount of 20% to 80% by weight, based on the weight of the total IR-reflecting pigment.

25. The process for producing an IR-reflecting pigment of claim 20, wherein the white pigments are arranged around the IR-reflecting core.

\* \* \* \* \*